(12) United States Patent
de Oliveira et al.

(10) Patent No.: US 10,005,565 B2
(45) Date of Patent: Jun. 26, 2018

(54) STABILIZED WING RIB COMPONENTS AND METHODS FOR ASSEMBLING SUCH STABILIZED WING RIB COMPONENTS WITH AT LEAST ONE OTHER AIRCRAFT AIRFOIL STRUCTURAL COMPONENT

(71) Applicant: EMBRAER S.A., São José dos Campos-SP (BR)

(72) Inventors: Adir Rodrigues de Oliveira, São José dos Campos-SP (BR); Bianca Lis Rossi Dias Endo, São José dos Campos-SP (BR); Marcos Roberto Cruz, São José dos Campos-SP (BR); Pedro Candia de Miranda, São José dos Campos-SP (BR); Maurilio Augusto Pinto, São José dos Campos-SP (BR); Mauro Pereira de Sousa, São José dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 110 days.

(21) Appl. No.: 14/264,209

(22) Filed: Apr. 29, 2014

(65) Prior Publication Data
US 2015/0307210 A1 Oct. 29, 2015

(51) Int. Cl.
| | |
|---|---|
| *B23B 47/28* | (2006.01) |
| *B64F 5/00* | (2017.01) |
| *B25B 5/02* | (2006.01) |
| *B64F 5/10* | (2017.01) |

(52) U.S. Cl.
CPC .......... *B64F 5/0009* (2013.01); *B23B 47/287* (2013.01); *B25B 5/02* (2013.01); *B64F 5/10* (2017.01); *B23B 47/284* (2013.01); *B23B 2215/04* (2013.01); *B23P 2700/01* (2013.01)

(58) Field of Classification Search
CPC ........... Y10T 408/567; Y10T 408/5635; B64F 5/0009; B64F 5/10; B25B 5/02; B23B 47/284; B23B 47/287; B23B 2215/04; B23B 2215/81; B23P 2700/01
USPC .................................................. 269/297–299
See application file for complete search history.

(56) References Cited

U.S. PATENT DOCUMENTS

| | | | | |
|---|---|---|---|---|
| 1,122,910 | A | * 12/1914 | Grant .................... | B23B 47/288 408/108 |
| 1,405,027 | A | * 1/1922 | Sprenger ................... | B27F 5/12 144/70 |
| 1,472,622 | A | * 10/1923 | Young ...................... | B23G 1/04 221/238 |

(Continued)

*Primary Examiner* — Ryan Rufo
(74) *Attorney, Agent, or Firm* — Nixon & Vanderhye P.C.

(57) ABSTRACT

Devices and methods for stabilizing a structural component are provided. The devices may include a main body component, a pair of opposed stabilization feet engageable with opposed regions of the structural component, a pair of coaxially disposed and reciprocal rectilinearly movable support shafts coupling the stabilization feet to the main body component, and an actuator assembly for rectilinearly moving the support shafts opposite to one another which in turn moves the stabilization feet between retracted and extended positions relative to the main body component. In use, the device may be positioned between opposed flanges of a structural component so as to stabilize the component and facilitate automated assembly processes.

10 Claims, 5 Drawing Sheets

(56) References Cited

U.S. PATENT DOCUMENTS

| | | | | |
|---|---|---|---|---|
| 2,412,459 | A * | 12/1946 | Stull | B23B 47/28 |
| | | | | 408/115 R |
| 2,602,238 | A * | 7/1952 | Wellman | B23B 47/288 |
| | | | | 144/27 |
| 5,127,139 | A * | 7/1992 | McCowin | B23B 39/22 |
| | | | | 29/26 A |
| 5,782,006 | A * | 7/1998 | Erway | B23B 47/288 |
| | | | | 269/242 |
| 5,860,774 | A * | 1/1999 | Teper | B23C 3/058 |
| | | | | 408/103 |
| 7,147,412 | B2 * | 12/2006 | Davis | B23B 47/288 |
| | | | | 269/156 |
| 8,056,859 | B2 * | 11/2011 | Kunichi | B21J 15/14 |
| | | | | 244/123.1 |
| 2002/0074705 | A1 * | 6/2002 | Marusiak | B23B 47/287 |
| | | | | 269/156 |

\* cited by examiner

STABILIZED WING RIB COMPONENTS AND METHODS FOR ASSEMBLING SUCH STABILIZED WING RIB COMPONENTS WITH AT LEAST ONE OTHER AIRCRAFT AIRFOIL STRUCTURAL COMPONENT

FIELD

The embodiments disclosed herein relate generally to devices and methods which stabilize a structural component during assembly with other parts, e.g., so as to facilitate automated assembly processes.

BACKGROUND

The planning processes for structural assembly is a critical period during fabrication since it has a permanent effect over the cost and quality of the finished product. In this regard, while automobiles and ships use different types of welding for structural fabrication, aeronautical structures require fabrication using rivets and bolts due to the high stresses and strains to which they are subjected during use. In order to maintain the structural integrity of segments that constitute the airframe of an aircraft, substantial attention must be given to the drilling process and insertion of rivets for joining various component parts.

The current practice for assembling aircraft structural components is to employ a number of steps which in turn increase the time needed to achieve full assembly. Moreover, the current practice of assembling aircraft structural components requires a large number of manual activities which in turn increases time, manufacturing cycle and the number of non-conforming assemblies during the process. For example, current aircraft assembly processes typically involve a pre-assembly of the components to allow for drilling, following which the components are disassembled, deburred, cleaned and then re-assembled with final fasteners (e.g., rivets and/or bolts).

An assembly process whereby the various component parts could be pre-aligned for automated drilling and final assembly without intermediate disassembly would thereby reduce the number of manual activities and cycle time, thereby increasing product quality and hence reduce overall production costs. In order to accomplish this type of a more efficient assembly process requires that the drilling of the component parts be accomplished reliably without creating swarf between the parts to be joined together. In such a manner, therefore, the swarf-free drilling of components could promote the direct joining of the components by rivets and/or bolts thereby avoiding the conventional process of disassembly and cleaning of the components.

In order to achieve the more efficient process as described above, however, it is necessary that the component parts be stabilized to prevent deflection due to drilling forces which could otherwise result in swarth being trapped between components to be joined. What has been needed in this art, therefore, are stabilization devices and methods whereby component parts may be reliably handled by robotics to allow for the automated drilling and final assembly of parts without necessarily disassembling the parts for cleaning and/or deburring. It is towards fulfilling such needs that the presently claimed invention is directed.

SUMMARY

In general, the embodiments disclosed herein are directed toward devices and methods which stabilize a structural component during assembly with other parts, e.g., so as to facilitate automated assembly processes. According to some embodiments, the stabilization device will include a main body component, a pair of opposed stabilization feet engageable with opposed regions of the structural component, a pair of coaxially disposed and reciprocal rectilinearly movable support shafts coupling the stabilization feet to the main body component, and an actuator assembly for rectilinearly moving the support shafts opposite to one another which in turn moves the stabilization feet between retracted and extended positions relative to the main body component.

According to certain embodiments, the stabilization feet may comprise an engagement surface at a terminal end therefore for engaging a respective one of the opposed regions of the structural component. Elongate recessed channels extending rearwardly from the engagement surface may be formed in the stabilization feet (e.g., so as to accommodate a drill bit to allow drilling of holes through a flange of the structural component and another part mated therewith).

The main body component according to certain embodiments may comprise an expansion chamber which houses opposed proximal ends of the support shafts, and wherein the actuator assembly comprises an actuator rod positioned substantially perpendicular to the support shafts and having a terminal engagement end which operably interacts with the opposed proximal ends of the shafts to rectilinearly move the shafts outwardly and inwardly relative to one in dependence upon a respective direction of turning movement applied to the actuator rod. The opposed ends of the shafts may comprise opposed beveled cam surfaces, wherein the terminal engagement end of the actuator rod is engageable with the cam surfaces. The actuator rod may be threadably coupled to the main body member so as to move the terminal engagement end of the actuator rod into and out of engagement with the cam surfaces depending on the direction of turning movement applied to the actuator rod (e.g., via a T-handle at an opposite end thereof). Springs (e.g., compression springs) may operatively associated with each of the support shafts for biasing the support shafts in a rectilinear inward direction relative to one another.

Certain embodiments will include a base plate attached to the main body member, and a clamp assembly operatively connected to the base plate for positionally clamping the base plate to the structural component. The base plate may, for example, be sized and configured to be accepted within an opening formed in the structural component (e.g., an opening formed in an aircraft wing rib component). In such a case, the clamp assembly may include a clamp arm which spans the opening formed in the structural component. Each opposed end of the clamp arm may include a clamp pad which may be forcibly seated against a surface region of the structural component adjacent to the opening. A set screw may be provided for removably connecting the clamp arm to the base plate.

The devices as described herein are especially adapted for aircraft fabrication processes (e.g., so as to allow at least some automated processing to occur, such as drilling of parts to be joined to one another). In this regard, the stabilization device may be clamped to the structural component such that the opposed stabilization feet are engaged with respective regions of opposed flanges of the structural component.

As noted above, each of the stabilization feet may be provided with spaced-apart elongate recessed channels extending rearwardly from engagement surfaces of the stabilization feet which engage with the respective regions of the opposed flanges. Thus, by positioning a part to be joined with the structural component in adjacent contact each of the opposed flanges, holes may be drilled through the part and the flange of the structural component in alignment with the recessed channels such that the recessed channels accommodate a terminal portion of the drill bit during such operation.

A base plate of the device may therefore be positioned within an opening formed in the structural member (e.g., an opening formed in an aircraft wing rib component) such that the clamp arm which spans the opening may be clamped to the structural component (e.g., by manipulating a set screw which connects the clamp arm to the base plate). Operating an actuator assembly of the device will thereby move the support shafts in opposite outward directions relative to one another to thereby cause the stabilization feet to engage a respective one of the opposed flanges of the structural member, whereby the component is stabilized.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
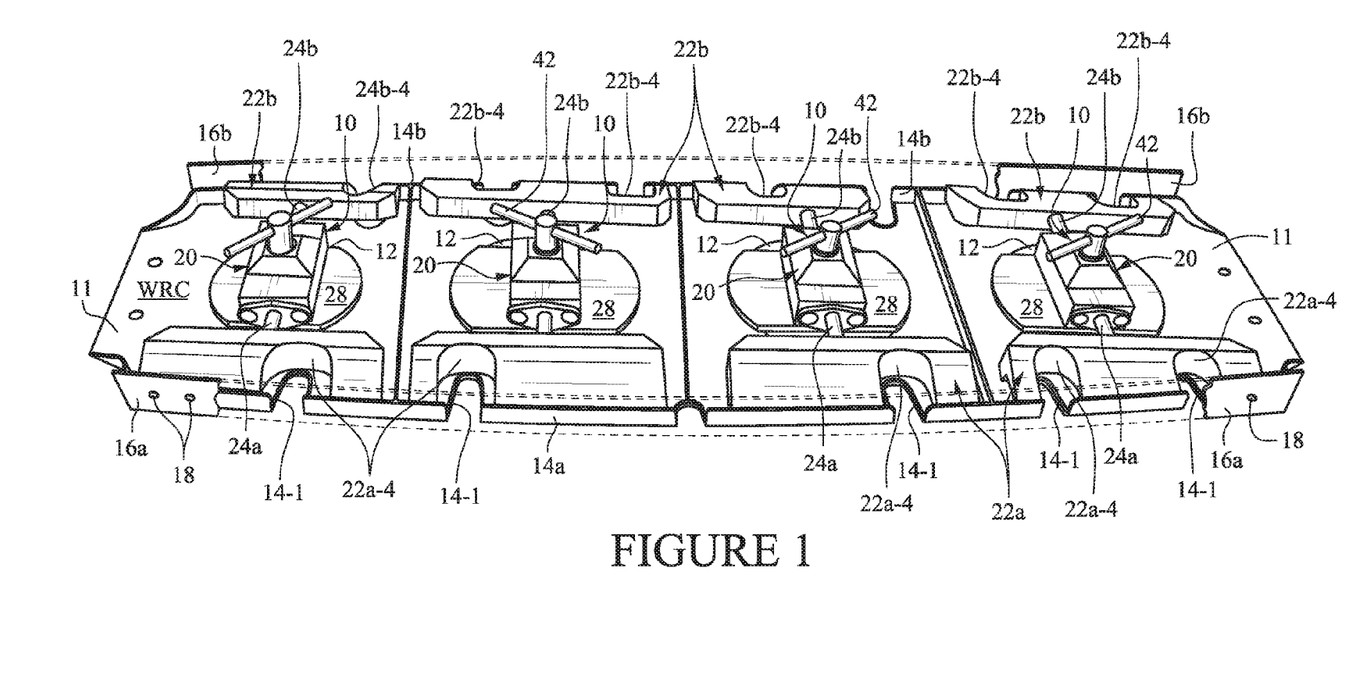
FIG. 1 is a top perspective view of a wing rib component associated with an aircraft airfoil structure which has been stabilized for assembly by a number of stabilization devices according to an embodiment of the present invention.
Figure 2:
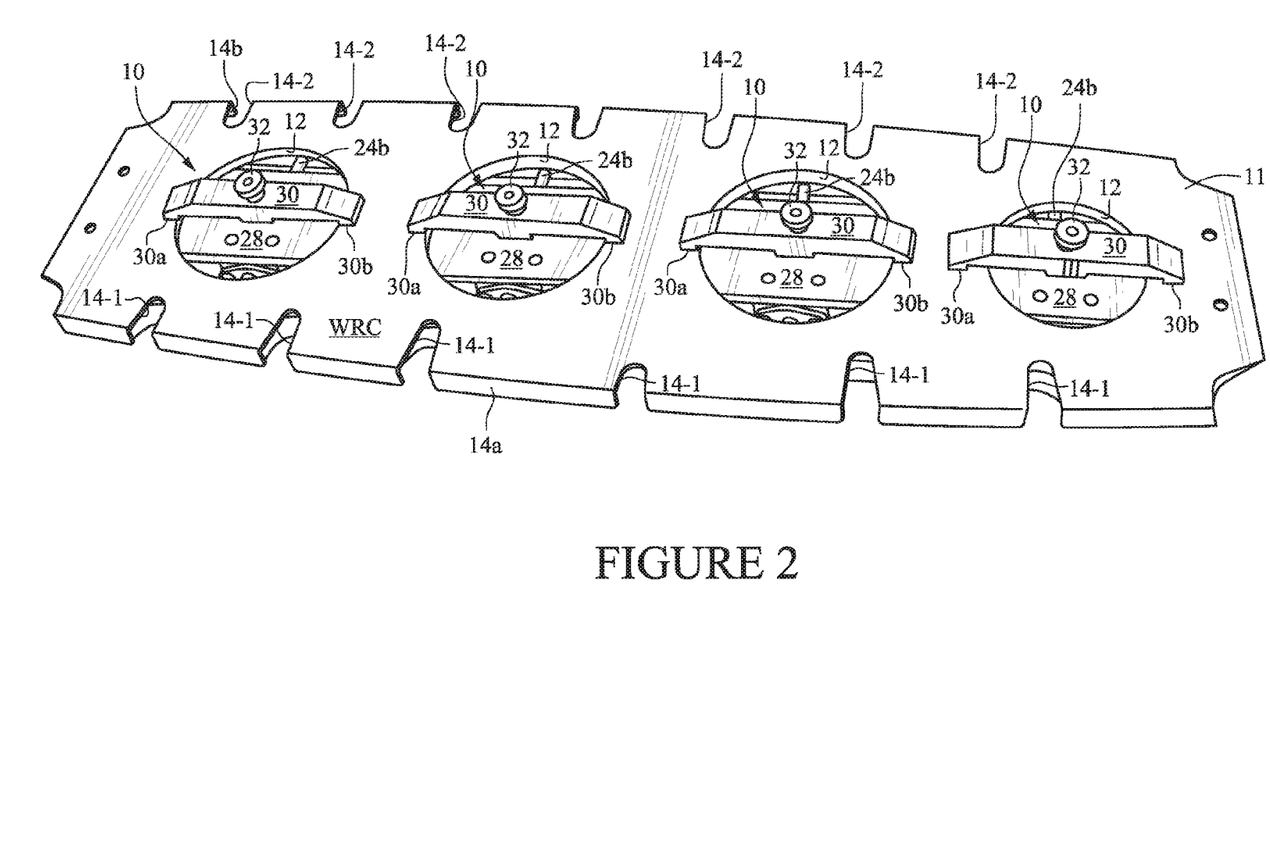
FIG. 2 is a bottom perspective view of the wing rib component and stabilization devices as shown in FIG. 1.

Accompanying FIGS. 1 and 2 depict a wing rib component WRC of an aircraft airfoil in combination with a number of stabilization devices 10 according to an embodiment of the invention. It will be observed that the wing rib component WRC will include an elongate central wing rib member 11, a lengthwise series of openings 12 formed through the central rib member 11, and opposed lengthwise extending flanges 14a, 14b. During the fabrication process, another component of the airfoil, e.g., strips of aluminum skin (portions of which are depicted in FIG. 1 by reference numerals 16a, 16b) are mated against the flanges 14a, 14b, respectively. The strips of aluminum skin 16a, 16b and flanges 14a, 14b are thereby drilled to form suitable receiving holes (a few of which are depicted in FIG. 1 by reference numeral 18) for placement of rivets by which the strips of skin 16a, 16b and the flanges 14a, 14b are joined one to another. In order to provide swarth-free drilling of the holes 18, the stabilization devices 10 are provided so as to resist deformation forces acting on the flanges 14a, 14b by means of a drill bit (not shown) which could otherwise tend to forcibly separate the flanges 14a, 14b from the skins 16a, 16b thereby allowing swarth to be deposited therebetween.

Figure 3:
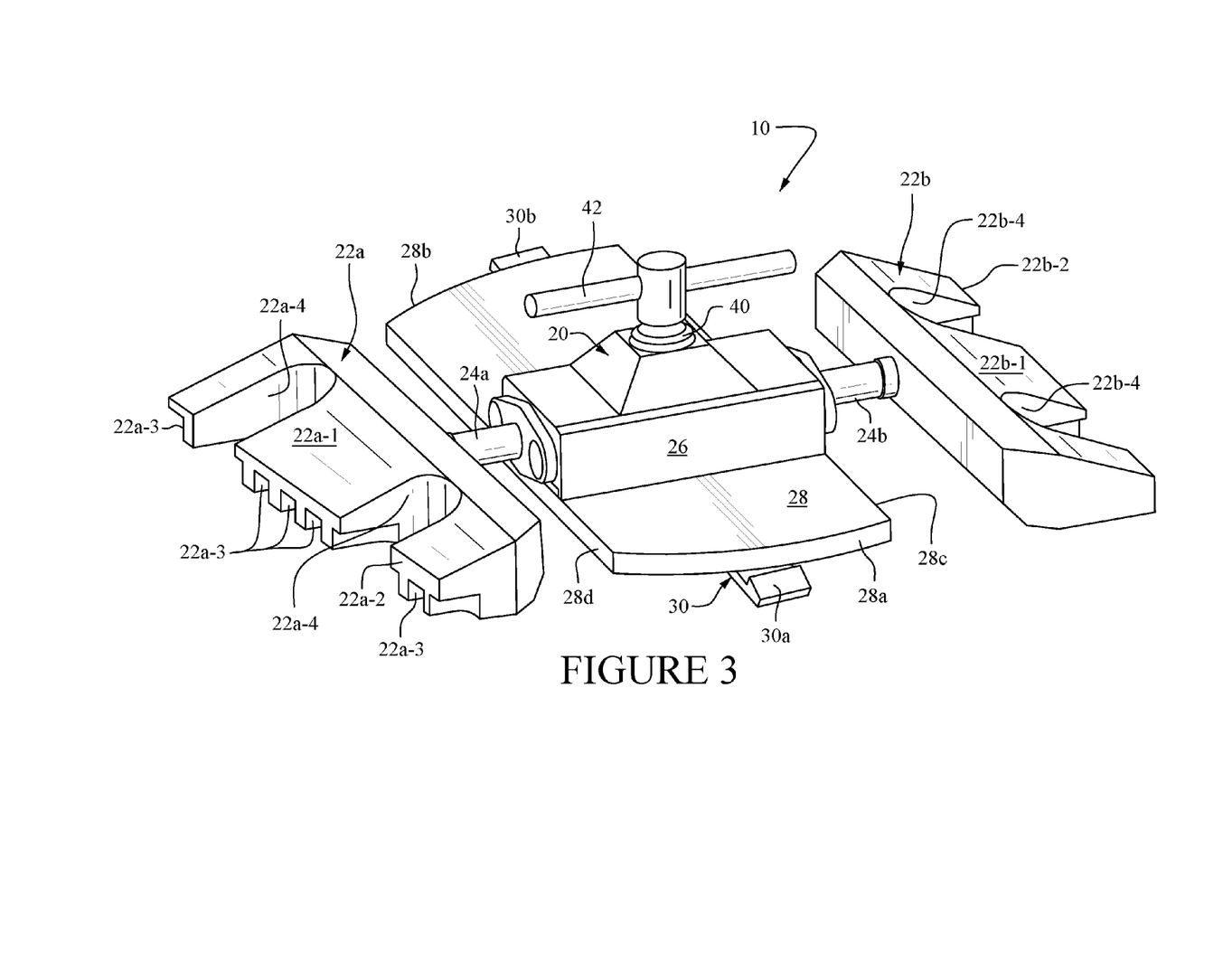
FIG. 3 is an enlarged left side perspective view of a stabilization device according to an embodiment of the present invention.

An exemplary stabilization device 10 is perhaps more clearly depicted in FIG. 3. As is shown, the stabilization device 10 is comprised generally of a main body member 20 and a pair of opposed stabilization feet 22a, 22b. As will be described in greater detail below, the feet 22a, 22b are operably joined to the main body member 20 by rectilinearly reciprocal moveable support shafts 24a, 24b, respectively.

The main body member 20 includes an expansion chamber 26 positioned on a central base plate 28. As can be seen from FIG. 2, the base plate 28 includes opposed arcuate edges 28a, 28b which conformably mate to the openings 12 provided in the wing rib component WRC, and a pair of opposed planar edges 28c, 28d extending between the arcuate edges 28a, 28b substantially parallel to the stabilization feet 22a, 22b. A clamp arm 30 is removably connected to the base plate 28 by means of a set screw 32. The opposed ends of the clamp arm 30 are provided with a respective clamp pad 30a, 30b. As shown in FIG. 2, the clamp arms 30 are of sufficient length to span the openings 12 so that each of the clamp pads 30a, 30b may be forcibly seated against a surface region of the wing rib component WRC. In such a manner therefore, the clamp arms 30 securely yet removably attach stabilization devices 10 to the wing rib component WRC.

Figure 4:
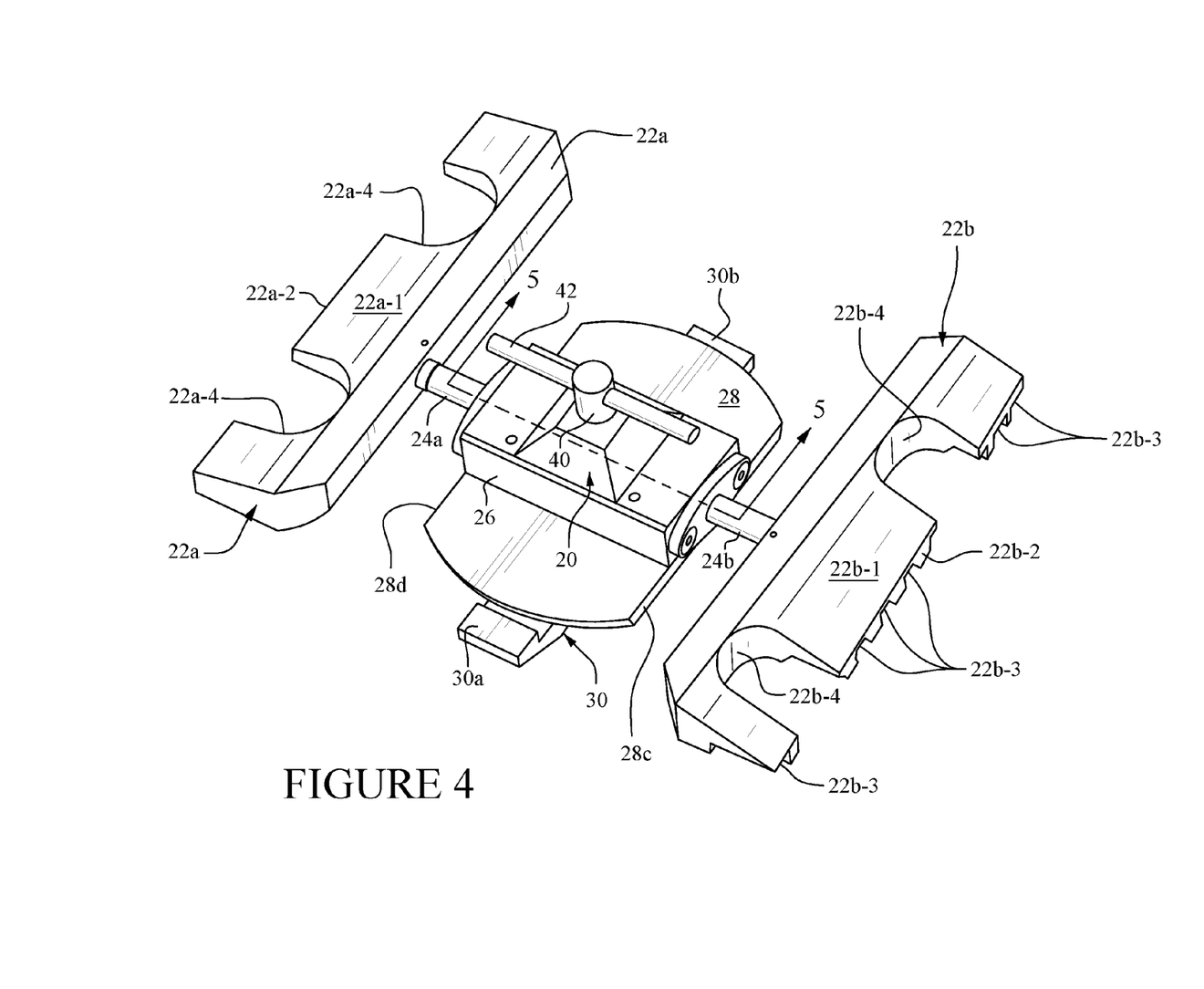
FIG. 4 is an enlarged right side perspective view of the stabilization device depicted in FIG. 3.

Each of the feet 22a, 22b includes a downwardly and outwardly (relative to the main body member 20) sloped surface 22a-1, 22b-1 terminating in a substantially planar perpendicular engagement surface 22a-2, 22b-2 which is adapted to engage with an interior surface region of the flanges 14a, 14b of the wing rib component WRC. The engagement surface 22a-2, 22b-2 includes a number of interiorly recessed notches 22a-3, 22b-3 each having a sufficient depth dimension so as to receive therein a portion of the drill bit when drilling the holes 18 through the skins 16a, 16b, respectively. Thus, by virtue of the recessed notches 22a-3, 22b-3, the engagement surfaces 22a-2, 22b-2 of the feet 22a, 22b can be maintained in forcible contact with the interior surfaces of the flanges 14a, 14b, respectively. As such, the feet 22a, 22b provide a secure foundation against which the flanges 14a, 14b are pressed to prevent separation of the flanges 14a, 14b from the skins 16a, 16b when the holes 18 are drilled therethrough. Each of the feet 22a, 22b may also include generally U-shaped recesses 22a-4, 22b-4 which are aligned with similar recesses 14-1, 14-2 formed in the wing rib component WRC.

Figure 5:
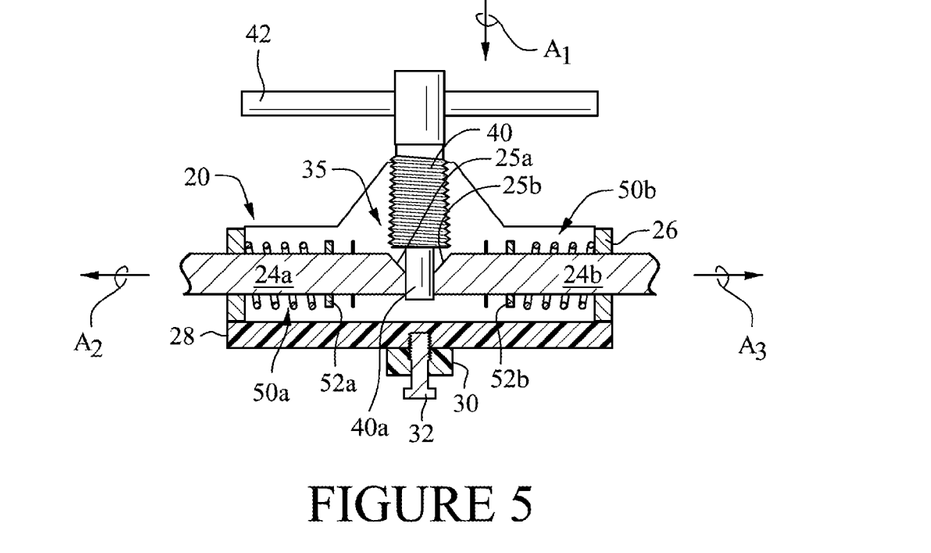
FIG. 5 is a partial cross-sectional elevational view of the stabilization device depicted in FIG. 4 as taken along lines 5-5 therein depicted in a fully extended state.
Figure 6:
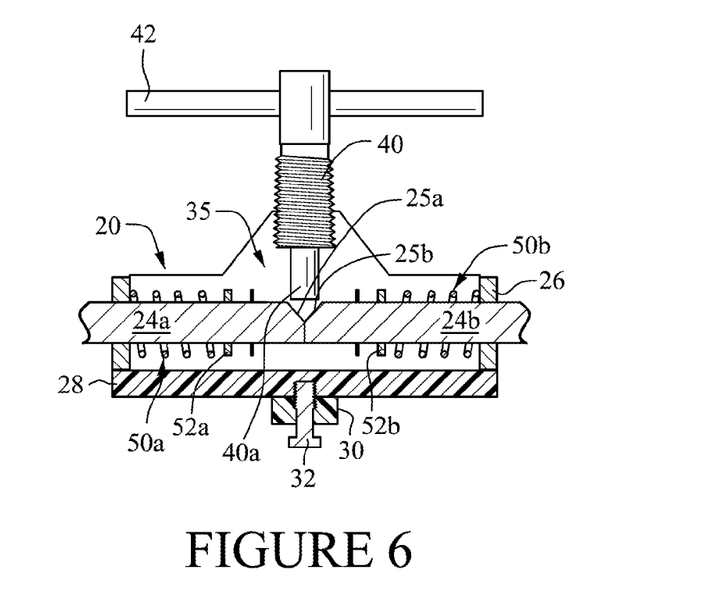
FIG. 6 is a partial cross-sectional elevational view of the stabilization device similar to FIG. 5 but depicted in a fully retracted state.

Accompanying FIGS. 5 and 6 show the internal structural mechanisms associated with an actuator assembly 35 housed within the expansion chamber 26 of the main body member 20 which allow a spreading to be exerted by the feet 22a, 22b against the respective flanges 14a, 14b. Specifically, each proximal end of the coaxially opposed shafts 24a, 24b includes oppositely disposed beveled cam surface 25a, 25b. A threaded actuator rod 40 is threadably engaged with the main body member 20 and is positioned substantially perpendicular to the support shafts 24a, 24b. The actuator rod also includes a terminal engagement end 40a which is capable of bearing against the cam surfaces 25a and 25b of the shafts 24a, 24b. A handle 42 is connected substantially perpendicular to the actuator rod 40 at the upper end opposite to the engagement end 40a thereof so as to form a T-shaped structure that can be manually manipulated to impart turning movement in a desired direction to the actuator rod 40.

The support shafts 24a, 24b includes coaxially positioned compression springs 50a, 50b acting between washers 52a, 52b fixed to the shafts 24a, 24b, respectively, and an opposed interior region of the expansion chamber 26.

Turning movement in a clockwise direction (assuming a standard right handed thread on the actuator rod 40) applied to the handle 42 will in turn cause the engagement end 40a to be moved downwardly into engagement with the cam surfaces 25a, 25b of the shafts 24a, 24b, respectively. Continued turning movement applied to the rod 40 will thereby cause the engagement end 40a to progressively be lowered (i.e., in the direction of arrow A1 in FIG. 5) which in turn causes each of the shafts 24a, 24b to be coaxially displaced in opposite directions (i.e., in the directions of arrows A2 and A3 in FIG. 5). This coaxial displacement of the shafts 24a, 24b will thereby cause the feet 22a, 22b connected at the distal ends thereof to be spread apart thereby force-loading the compression springs 50a, 50b, respectively, to thus forcibly maintain the feet 22a, 22b against the inside of the flanges 14a, 14b of the wing rib component WRC.

When it is desired to remove the stabilization assembly 10 from the wing rib component WRC, a turning force in an opposite direction to that described above may be applied to the handle 42 to thereby raise the engagement end 40a of the actuator rod 40 (i.e., in a direction opposite to arrow A1 in FIG. 5) relative to the cam surfaces 25a, 25b. This in turn causes the shafts 24a, 24b to be retracted towards one another (i.e., in directions opposite to arrows A2 and A3 in FIG. 5) under the influence of the bias force provided by the compression springs 50a, 50b, respectively (i.e., since the force of the springs 50a, 50b will then be unloading).

Accompanying FIG. 5 the shafts 24a, 24b in fully extended state (i.e., since the engagement end 40a is in a maximum downward extent relative to the cam surfaces 25a, 25b of the shafts 24a, 24b, respectively), whereas accompanying FIG. 6 shows the shafts 24a, 24b in a fully retracted state (i.e., since the engagement end 40a is fully disengaged from the cam surfaces 25a, 25b). When in a state as depicted in FIG. 5, the feet 22a, 22b will exert maximum compressive force against the inside of the flanges 14a, 14b, whereas when in a state depicted in FIG. 6, the feet 22a, 22b will be physically separated from the flanges 14a, 14b thereby permitting removal of the stabilization device 10 from the wing rib component WRC.

Although the stabilization device 10 has been described above as being employed in combination with a wing rib component WRC, it will be understood that such a description is merely an exemplary embodiment of the invention. Thus, other embodiments of the invention could be provided so as to facility the assembly of other components associated with an aircraft or with any other structure, e.g., automobile, ship or the like.

It will therefore be understood that the description provided herein is presently considered to be the most practical and preferred embodiment of the invention. Thus, the invention is not to be limited to the disclosed embodiment, but on the contrary, is intended to cover various modifications and equivalent arrangements included within the spirit and scope thereof.

What is claimed is:

1. A stabilized wing rib component of an aircraft airfoil structure to facilitate automated drilling to permit assembly with at least one other airfoil structural component, wherein the stabilized wing rib component comprises:

a wing rib component which includes a central rib member having (i) opposed first and second rib surfaces, (ii) an opposed pair of lengthwise extending flanges which are upturned relative to the first rib surface, and (iii) a lengthwise oriented series of openings formed in the central rib member between the flanges which extending through the central rib member from the first rib surface to the opposed second rib surface, the flanges being adapted for connection with the at least one other airfoil structural component; and a plurality of stabilization devices removably engaged with the wing rib component so as to stabilize the wing rib component during assembly with the at least one other airfoil structural component, wherein each of the stabilization devices includes:

(i) a main body component;

(ii) a pair of opposed stabilization feet which are elongated in a lengthwise direction of the wing rib component, wherein each of the stabilization feet includes an engagement surface at a terminal end thereof which is engaged with an inner region of a respective one of the opposed flanges of the wing rib component, wherein the stabilization feet include elongated open recessed channels being spaced apart from one another along a lengthwise direction of the stabilization feet and extending rearwardly from the engagement surface thereof to receive therein a drill bit during automated drilling of the opposed flanges to facilitate assembly of the wing rib component with the at least one other airfoil structure;

(iii) a pair of coaxially disposed and reciprocal rectilinearly opposed movable support shafts having distal ends coupled to a respective one of the stabilization feet so as to connect the stabilization feet to the main body component perpendicularly to the lengthwise direction of the wing rib component, and proximal ends having opposed beveled cam surfaces;

(iv) an actuator assembly comprising an actuator rod substantially perpendicular to the support shafts, the actuator rod being threadably coupled to the main body, wherein the actuator assembly comprises a terminal engagement end which operably interacts with the opposed beveled cam surfaces of the proximal ends of the support shafts for rectilinearly moving the support shafts opposite to one another in an actuation direction perpendicular to the enlongated direction of the stabilization feet, the support shafts being moved in the actuation direction in dependence upon turning movement of the actuator rod which in turn moves the stabilization feet between retracted and extended positions relative to the main body component so as to respectively disengage the stabilization feet from and engage the engagement surfaces of the stabilization feet with the inner regions of the opposed flanges;

(v) compression springs operatively associated with each of the support shafts for biasing the support shafts in a rectilinear inward direction relative to one another toward the retracted position thereof;

(vi) a base plate attached to the main body component, wherein the base plate includes an opposed pair of planar edges extending substantially parallel to the stabilization feet in the enlongated direction thereof and a pair of opposed arcuate edges at a terminal extent of the planar edges, the arcuate edges being configured to conformably mate to a respective one of the openings formed in the central rib member so that the base plate is positionally accepted within the respective one of the openings formed in the central rib member; and (vii) a clamping assembly operatively connected to the base plate for positionally clamping the base plate within the respective one of the openings, wherein the clamping assembly comprises a clamp arm which is threadably coupled to the base plate, and clamp pads formed on opposed terminal ends of the clamp arm, the clamp arm being sufficiently elongated in the lengthwise direction of the wing rib component such that clamp arm spans the respective one of the openings of the central rib member and thereby position the clamp pads for releasable engagement with a subjacent region of the second rib surface of the central rib member adjacent to the respective one of the openings to thereby positionally fix the base plate within the respective one of the openings.

2. The device of claim 1, wherein the main body component comprises an expansion chamber which houses the opposed proximal ends of the support shafts.

3. The device of claim 1, wherein the actuator assembly comprises a handle connected to the actuator rod at an end opposite to the terminal engagement end thereof.

4. The device of claim 1, wherein the clamp assembly includes a set screw for removably connecting the clamp arm to the base plate.

5. A method of fabricating an aircraft airfoil structure which comprises:

(a) providing the stabilized wing rib component according to claim 1;

(b) positioning the stabilized wing rib component adjacent to at least one other airfoil structural component to which the stabilized wing rib component is to be joined;

(c) drilling holes through the opposed flanges of the stabilized wing rib component and the at least one airfoil structural component to which the stabilized wing rib component is to be joined at locations corresponding to the elongated open recessed channels of the stabilization feet; and (d) joining the stabilized wing rib component to the at least one airfoil component by inserting a fastener into the hole.

6. The method of claim 5, wherein prior to step (a) the method further comprises clamping the plurality of stabilization devices to the wing rib component such that the opposed stabilization feet are engaged with respective inner regions of the opposed flanges thereof.

7. The method as in claim 6, which prior to step (a) further comprises the steps of:

positioning the base plate of each stabilization device of the plurality of stabilization devices within a respective one of the openings formed in the wing rib component; and clamping the clamp arms which span the openings to the central rib member.

8. The method of claim 6, which comprises operating each actuator assembly of each stabilization device of the plurality of stabilization devices so as to move the support shafts of each stabilization device in opposite outward directions relative to one another to thereby cause the stabilization feet to engage a respective one of the opposed flanges of the wing rib component.

9. The method of claim 5 which after step (d) further comprises the step of:

(e) removing the plurality of stabilization devices from the wing rib component.

10. The method of claim 9, wherein step (e) comprises operating the actuator assembly of each stabilization device of the plurality of stabilization devices so as to move the engagement feet of the stabilization devices into the retracted position thereof, and disengaging the clamp feet from the opposed flanges of the central rib member.

* * * * *